(12) United States Patent
Tsuru

(10) Patent No.: US 6,529,650 B1
(45) Date of Patent: Mar. 4, 2003

(54) OPTICAL CIRCUIT BOARD AND METHOD OF MANUFACTURING THE SAME

(75) Inventor: Yoshiyuki Tsuru, Shimodate (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 09/582,097
(22) PCT Filed: Dec. 21, 1998
(86) PCT No.: PCT/JP98/05772
§ 371 (c)(1),
(2), (4) Date: Jun. 22, 2000
(87) PCT Pub. No.: WO99/32913
PCT Pub. Date: Jul. 1, 1999

(30) Foreign Application Priority Data

Dec. 22, 1997 (JP) ............................................. 9-352859

(51) Int. Cl.[7] .................................................. G02B 6/12
(52) U.S. Cl. ............................. 385/14; 385/39; 385/42; 385/88; 385/92; 385/147; 385/49
(58) Field of Search ...................... 385/14, 15, 16, 385/24, 39, 42, 47, 88, 89, 92, 123, 147, 49; 438/25, 26, 27, 29

(56) References Cited

U.S. PATENT DOCUMENTS

| | | | |
|---|---|---|---|
| 4,493,113 A | | 1/1985 | Forrest et al. .............. 385/38 X |
| 4,621,895 A | | 11/1986 | Motsko ...................... 385/31 X |
| 4,732,446 A | * | 3/1988 | Gipson et al. ................. 385/24 |
| 4,744,617 A | * | 5/1988 | Hvezda et al. ................. 385/24 |
| 4,872,739 A | * | 10/1989 | Kahn et al. .................... 385/24 |
| 4,900,118 A | * | 2/1990 | Yanagawa et al. ............. 385/24 |
| 5,146,520 A | * | 9/1992 | Yuuki et al. ................... 385/45 |
| 5,204,925 A | | 4/1993 | Bonanni et al. ............... 385/89 |
| 6,002,821 A | * | 12/1999 | Yoshida ........................ 385/24 |

FOREIGN PATENT DOCUMENTS

| | | | |
|---|---|---|---|
| EP | 0292331 | 11/1988 | ............... 385/14 X |
| EP | 0439125 | 7/1991 | ............... 385/42 X |
| EP | 0522305 | 1/1993 | ............... 385/42 X |
| EP | 0526776 | 2/1993 | ............... 385/14 X |
| EP | 0 526 776 | 10/1993 | ............... 385/14 X |
| EP | 0713112 | 5/1996 | ............... 385/14 X |
| EP | 0813083 | 6/1996 | ............... 385/14 X |
| EP | 0813083 | 12/1997 | ............... 385/14 X |
| JP | 3-182707 | * 8/1991 | ............... 385/49 X |
| JP | 9-90177 | * 4/1997 | ............... 385/49 X |
| JP | 6-102426 | * 4/1997 | ............... 385/14 X |

OTHER PUBLICATIONS

G. DePestel, et al., "Parallel Optical Interconnections for Future Broad Band Systems, Based on the Fibre in Board Technology", Proceedings of the Electronic Components and Technology Conference, U.S., New York, vol. 46, May 28, 1996, pp. 264–268.
G. De pestel et.al. "Parallel Optical Interconnections . . . " 1996 Elect Comp. Tech Conf.

* cited by examiner

*Primary Examiner*—Brian Healy
(74) *Attorney, Agent, or Firm*—Antonelli, Terry, Stout & Kraus, LLP

(57) ABSTRACT

An optical circuit substrate having optical fiber placed and fixed in the form of a circuit on one side or on both sides of a substrate can be prepared with good efficiency by providing thereto an optical interconnection portion which makes an area for optical connection smaller and registration between an optical element and optical fiber easy.

77 Claims, 3 Drawing Sheets

OPTICAL CIRCUIT BOARD AND METHOD OF MANUFACTURING THE SAME

TECHNICAL FIELD

The present invention relates to an optical circuit substrate comprising a substrate and optical fiber laid and fixed in the form of a circuit on the substrate.

Optical fiber is employed in communication which use light having a very high frequency as the carrier wave, and has advanced as a communication medium which enables a high quality transmission with a small loss over a long distance.

It has been proposed and developed in recent years to use the optical fiber, which has been developed thus for use in long distance communication, for transmission in a short distance communication or in an apparatus in place of electric wire, which permits transmission of only a relatively small amount of information.

For example, JP-A-61-186908 discloses, in the field of communication systems or instrumentation systems which operate by utilizing inter-transformation between light and electrons, a system in which three or more layers of substrates each provided with a driving circuit comprising an optical active element, an optical passive element and an optical active element are provided and optical circuits are provided between the substrates. With regard to optical fiber, there is described in the disclosure that an optical branching-coupling device 60 mm in length has been provided by using two lines of optical fiber with a spacing of 2 mm on a UV resin substrate.

JP-A-1-180505 discloses a method of forming an optical circuit wherein optical fiber is laid on a substrate through the medium of an adhesive layer. It is described therein that the optical fiber has been laid by using a laying tool on an acrylic adhesive layer formed on an ABS resin substrate.

JP-A-4-311905 discloses a circuit board in which a flexible base material having optical fiber interposed therein is sticked to a rigid substrate such that the flexible base material rises over the substrate from the intermediate part of the substrate so that the tip of the optical fiber can be connected to a connector.

Furthermore, as disclosed in JP-A-1-183605, there is known an optical circuit substrate which has on the end face of the substrate a condensing lens that receives aslant a light from the optical fiber.

When, as disclosed in JP-A-61-186908, in communication systems or instrumentation systems which operate by utilizing inter-transformation between light and electrons, three or more layers of substrates each provided with a driving circuit comprising an optical active element, an optical passive element and an optical active element are provided, and optical circuits are provided between the substrates, there arise disadvantages in that the thickness of the resulting substrate is unfavorably large and moreover, when a fault occurs in the optical circuit, the entire part of the substrate including the electron circuit has to be replaced, leading to an economical disadvantage.

In the above-mentioned method, furthermore, there is a large gap between the accuracy of alignment required for optical interconnection and the accuracy of actual electrical mounting of an optical element, etc., so that allowance for absorbing a considerable accuracy gap is necessary in the optical interconnection part. This leads to an increased size of the substrate and resultant disadvantage in practice.

From such a viewpoint, it is economically more advantageous to provide an optical circuit alone independently, as disclosed in JP-A-1-180505 and JP-A-4-311905.

However, when optical fiber is laid on an adhesive layer by means of a tool, as disclosed in JP-A-1-180505, the entire part of the optical fiber is fixed to the adhesive and, to take out signals from the optical circuit, it is necessary to peel off the necessary part or to take some means not to fix the necessary part, and the optical fiber which has not been fixed is apt to be broken.

Further, even when, as disclosed in JP-A-4-311905, a flexible base material having optical fiber interposed therein is sticked to a rigid substrate such that the flexible base material is raised over the substrate from the intermediate part of the rigid substrate (to assume a form of so-called "pig tail") so that the tip of the optical fiber can be connected to a connector, there are problems in that the fiber which has not been fixed is similarly apt to be broken, that the optical fiber connected to the tip of the raised optical fiber needs an optical inter-connection part of increased size because the area of the member part is large and that the length of the fiber which is not fixed increases because a certain extent of movement is necessary at the time of operation of connecting a connector.

When a condensing lens which receives obliquely a light from optical fiber is provided at the end face of the substrate as disclosed in JP-A-1-183605, there arises a problem in that when the angle of inclination is decreased, the position of fixing the optical fiber has to be lowered, whereas when the angle is increased the height of the substrate has to be increased.

An object of the present invention is to provide an optical circuit substrate which permits the connection of the optical circuit with good accuracy and without occupying much space and a process for preparing such an optical circuit substrate with good efficiency.

DISCLOSURE OF THE INVENTION

The present invention provides an optical circuit substrate comprising an optical fiber placed and fixed in the form of a circuit on a surface of a substrate, wherein an end portion of the optical fiber is cut so as to have an angle which permits refraction or reflection of light most in the direction of 90 degrees relative to the substrate surface, and said substrate having a hole therethrough beneath the cut-section of the fiber, said hole having a metal film on the inner wall thereof, and a process for the preparation thereof.

The present invention also provides an optical circuit substrate comprising optical fibers placed and fixed in the form of a circuit on both surfaces of a substrate, wherein an end portion of the optical fiber is cut so as to have an angle which permits refraction or reflection of light most in the direction of approximately 90 degrees relative to the substrate surface, said substrate having holes therethrough beneath the cut-section of the fiber, and the cut-section of the optical fiber being provided on both surfaces of at least one of the holes, and a process for the preparation thereof.

The present invention further provides a process for the preparation of an optical circuit substrate, which comprises placing and fixing an optical fiber in the form of a circuit on a surface of a flexible base material, the optical fiber being provided so as to extend farther outside than the flexible base material, making an optical fiber fixed to another rigid substrate intersect with the optical fiber provided previously so as to extend farther outside than the flexible base material, and connecting the two fibers by applying a light-transmittable adhesive to the intersecting point of the fibers.

The present invention still further provides a process for the connection of optical circuits which comprises making two plastics-made optical fibers intersect with each other, and connecting the two fibers by applying pressure to the intersecting point of the fibers while applying energy by vibration to the point.

BEST MODE FOR CARRYING OUT THE INVENTION

First aspect of the Invention

The optical circuit substrate of the present invention is an optical circuit substrate having optical fiber placed and fixed in the form of a circuit on a surface of a substrate, wherein an end portion (or part) of the optical fiber is cut so as to have an angle which permits refraction or reflection of light most in the direction of 90 degrees relative to the substrate surface, and said substrate having holes therethrough beneath the cut-section of the fiber, each hole having a metal film on the inner wall thereof.

Figure 1:
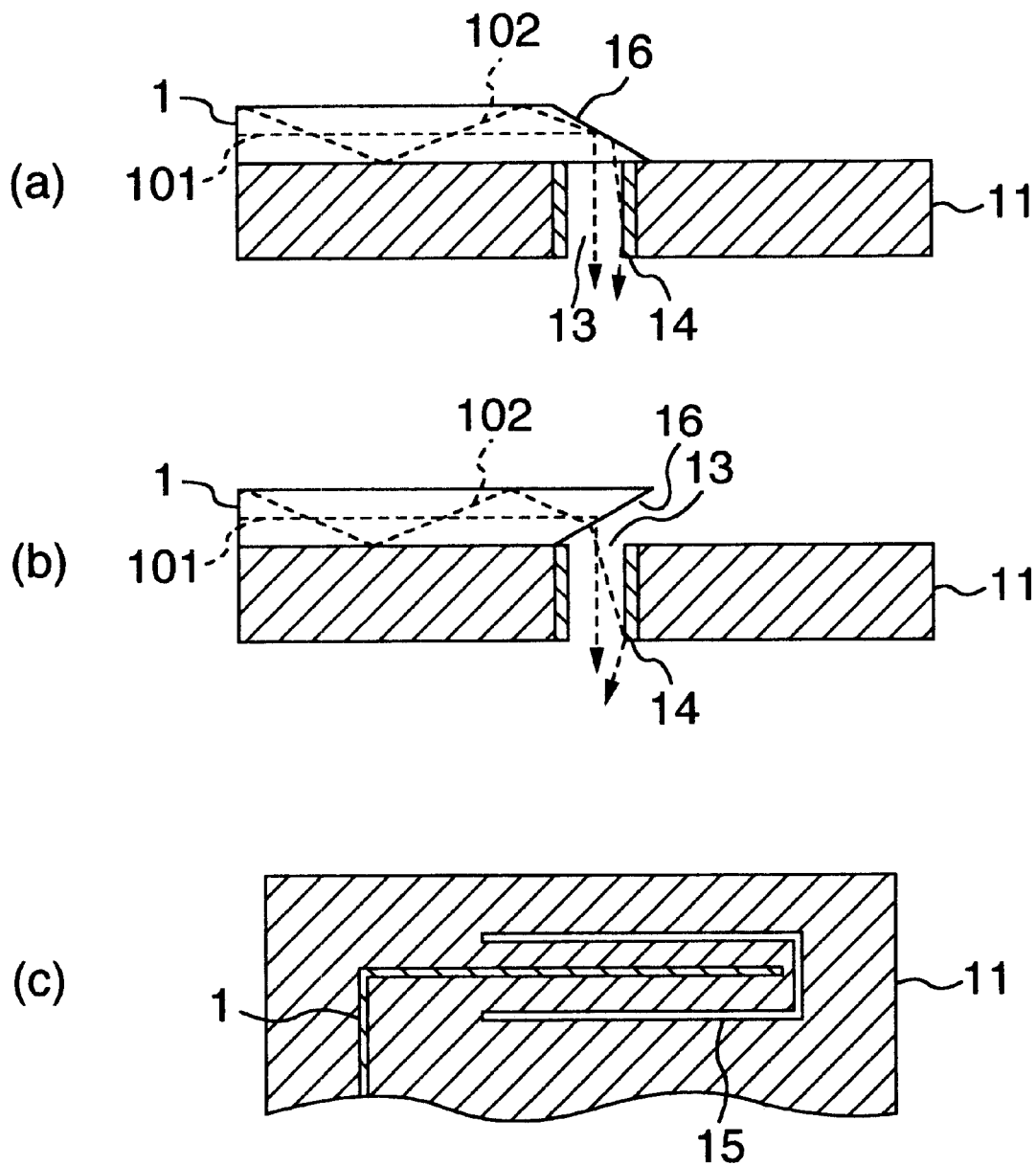
In FIGS. 1, (a) and (b) are each a schematic sectional view for illustrating the principle of the first aspect of the present invention, and (c) is a plan view for illustrating one embodiment of the present invention.

The angle which permits the end part of the optical fiber 1 to refract or reflect light most to the direction of 90 degrees relative to the surface of the substrate 11 is such an angle that, as shown in FIG. 1(a) or FIG. 1(b), not only the light 101 which has been transmitted in the optical fiber 1 and is parallel to the central axis of the optical fiber but also the light 102 which has been reflected by the internal periphery of the optical fiber are reflected or refracted at the cut-section 16, then introduced into a hole 13 provided beneath the cut-section 16 of the optical fiber 1 and having a metal film 14 provided on its internal wall, and thus can connect an optical circuit. The cut-section 16 is preferably cut at an angle of about 45 degrees to the length direction of the optical fiber 1.

The hole 13 may also be filled with a light-transmittable resin, whereby the deposition of dust and dirt from surroundings can be prevented during use and hence the optical connection route can be secured more easily.

In the hole 13, the light input and output part of a light receiving and transmitting element may be placed on a side not contacting with the optical fiber 1, and registered and connected to the hole 13 provided beneath the cut-section 16 of the optical fiber 1. In this case, since the element is attached perpendicularly to the substrate 11, the mounting area can be reduced and the increase of the thickness of the substrate 11 can be obviated.

When the light-transmittable resin filled in the hole 13 is composed of resins different in refractive index between the resin of the internal wall side of the hole and that of the central side of the hole such that the refractive index of the resin used in the internal wall side of the hole is higher than that of the resin used in the central side of the hole, the loss in connection can be favorably reduced. Further, a lens may be provided in the hole.

The substrate 11 used may be one which has a conductor circuit on the surface of an insulating substrate or of an inner layer circuit substrate insulation-treated with prepreg, or one which has a conductor circuit layer and an optical circuit layer separately, or one which comprises a combination of a conductor circuit substrate and an optical circuit substrate.

It is also possible to use a resin film as the substrate material and to use an adhesive-coated resin film, an adhesive resin film or a photosensitive resin as a means for fixing the optical fiber 1.

It is possible to use an optical circuit substrate wherein, in the plane shape thereof a cut or a projection is formed, the optical fiber 1 is laid continuously from the main portion of the optical circuit substrate to the portion surrounded by said cut or to the projection, and the cut-section 16 is provided for the portion surrounded by the cut or the projection.

Such an optical substrate may be prepared, for example, by making a hole 13 which passes through a substrate 11, metallizing the inner wall of the hole, placing and fixing optical fiber 1 in the form of a circuit on a surface of the substrate 11, and then cutting an end part of the optical fiber 1 at the place of the hole 13 provided previously so as to make the resulting end part have an angle which permits refraction or reflection of light most in the direction of 90 degrees relative to the surface of the substrate 11.

The optical substrate may also be prepared by making a hole 13 which passes through a substrate 11, metallizing the inner wall of the hole and then, while placing optical fiber 1 in the form of a circuit on the surface of the substrate, cutting an end part of the optical fiber 1 so as to fix the resulting cut-section 16 just above the hole 13 provided previously and to have an angle which permits refraction or reflection of light most in the direction of 90 degrees relative to the surface of the substrate 11.

Further, the optical substrate may be prepared by placing and fixing optical fiber 1 in the form of a circuit on a surface of a substrate 11, cutting the optical fiber 1 at the place of the hole 13 provided previously so as to have an angle which permits refraction or reflection of light most in the direction of 90 degrees relative to the surface of the substrate 11, then providing a hole 13 beneath the cut-section 16 of the optical fiber 1 from the back side of the substrate 11, and metallizing the inner wall of the hole.

Still further, the optical substrate may be prepared by cutting an end part of optical fiber 1, while placing and fixing the optical fiber 1 in the form of a circuit on a surface of a substrate 11, so as to fix the cut-section 16 thus formed just above a hole 13 to be provided later and to have an angle which permits refraction or reflection of light most in the direction of 90 degrees relative to the surface of the substrate 11, then providing a hole 13 beneath the cut-section 16 of the optical fiber 1 from the back side of the substrate 11, and metallizing the inner wall of the hole.

The laying of optical fiber 1 may be conducted by pressure bonding or heat-pressure bonding of the optical fiber 1, while feeding the optical fiber 1 onto a sticky film or adhesive film provided on the substrate 11, at fixing positions varied by means of an NC apparatus.

The cut-section 16 of the optical fiber 1 may be nearly specularly finished by treating it with abrasives, hydrofluoric acid, borofluoric acid, solvents, etc., whereby the loss can be favorably suppressed.

The form of the signal light transmittable resin surface may be controlled according to the extent of filling of the resin in the hole; a convex lens form may be obtained by filling the hole with the resin in an amount more than the inside volume of the hole and a concave lens form may be obtained by filling the hole with the resin in an amount less than the inside volume of the hole.

It is also possible to adhere a lens to the opening of the hole 13 which is not in contact with the optical fiber 1, after filling a signal light transmittable resin in the hole.

The hole 13 for optical connection may be provided by using a laser, or the hole 13 may be provided by using a photosensitive resin sheet and subjecting it to light exposure and development.

It is also possible, by using two kinds of photosensitive resins, to fill the hole 13 with a light-transmittable resin having a low refractive index, then bore a hole of a diameter smaller than that of the original hole and fill therein a light-transmittable resin having a high refractive index.

The optical fiber 1 used in the present invention is preferably quartz fiber because of its excellent resistance to laser beams. However, plastics fiber or metal film-coated plastics fiber may also be used so long as they are satisfactorily resistant to laser beams. Optical fibers 1 coated with a resin or the like may also be used so long as the resin or the like can be removed with laser beams.

The placing and fixing of optical fiber 1 in the form of a circuit on the substrate 11 may be achieved by laminating an adhesive sheet having stickiness on the substrate 11, then pressure-bonding the fiber thereon by heat and/or an ultrasonic jig, and forming the circuit by such means as an X-Y table. Further, if necessary, a protective fixing layer may be provided on the fixed fiber by using a prepreg, an adhesive resin film or a photosensitive resin.

The hole 13 provided for the optical fiber 1 from the back side of the substrate 1 in the present invention may be formed by using an infrared laser or eximer laser. To reduce adverse thermal influence, laser beams with a short pulse and a high energy density per unit time are suitably used. The hole 13 can also be made by using plasma, but the use of a mask is necessary.

The resin which can be bored therethrough by using laser beams may be such materials conventionally used for laminated sheets as epoxy resin, polyimide resin and the like. Organic or inorganic fillers may also be used in the resin in a range not harmful to laser boring. The method used for filling may be pressing, casting, printing, etc.

The method used for metallizing the internal wall of the hole 13 may be any desired one but it is economically advantageous to use the electroless plating method employed in metallizing the through-hole of a printed wiring board. The metal used may be copper, but metals which are not susceptible to oxidation and are glossy, for example nickel, are more preferred.

For cutting the optical fiber in the present invention, a rotary knife, e.g., a diamond cutter or a dicing saw which has a thickness of 250 μm and in which the knife edge has an angle which permits refraction or reflection of light most in the direction of 90 degrees relative to one side of the rotary plane of the rotary knife may be used to form an intended section. It is also possible to cut the fiber by using a similar rotary knife having a knife edge angle of 90 degrees, at an inclination of 45 degrees relative to the substrate surface.

By filling a light-transmittable resin in the hole 13 of the substrate formed by laser beams in the present invention, the input and output of light signals from and to the optical fiber 1 can be improved. When the part of the light-transmittable resin exposed on the substrate surface is made to take the form of a lens, the signal transmission efficiency can be improved. It is also favorable to adhere a minute lens-formed article to the part of the light-transmittable resin exposed on the substrate surface.

Such a signal light transmittable resin is preferably a transparent resin, such as acrylic resin, but any resins may be used so long as they are light-transmittable, examples of which include epoxy resins, particularly acrylic-modified epoxy resins and fluorine-containing epoxy resins, and polyimide resins.

It is further preferable for improving the signal transmission efficiency of the hole part that, after filling a signal light transmittable resin in the hole 13 formed, a hole having a smaller diameter is formed again from the back side of the substrate 11 and then a resin having a slightly higher refractive index than the initially filled resin is filled therein.

It is further preferable for improving the signal transmission efficiency to connect, with a light transmittable resin, the optical element for receiving and transmitting light signals positioned on the back side of the substrate 11 with the part of light-transmittable resin exposed on the back side of the substrate, or the lens-formed article on the substrate surface or, directly, the cut-part of the optical fiber.

It is favorable and preferable for suppressing the leakage of light at the cut-section 16 to form a low refractive index material layer at the cut-section 16 of the optical fiber 1.

For forming a U-shaped cut 15 as shown in FIG. 1(c) on the substrate 11 at the signal take-out site of the optical fiber 1, a cutter knife, router, or the like may be used.

According to the present invention, since no "pig tail" is used, the risk of the optical fiber 1 being broken is low and, since a light take-out hole 13 is formed by using laser beams, light is taken out easily. Further, since a method of cutting a fixed fiber is used for forming the reflecting surface of the optical fiber 1 which serves for taking out light, the preparation is easy. According to the above-mentioned structures, an optical fiber wiring substrate for optical interconnection which requires only a small area for optical connection is obtained.

Moreover, by forming the whole of the optical fiber wiring substrate with a flexible material, the alignment of the entrance and exit part of the fiber with an optical element can be easily achieved by utilizing the deformation of the substrate 11. The U-shaped cut 15 formed in the substrate 11 similarly makes the alignment be achieved more easily and, at the same time, makes it possible to take out only the part of optical connection between the element and the fiber, and thus can enhance the reliability of connection.

Second Aspect of the Invention

Figure 2:
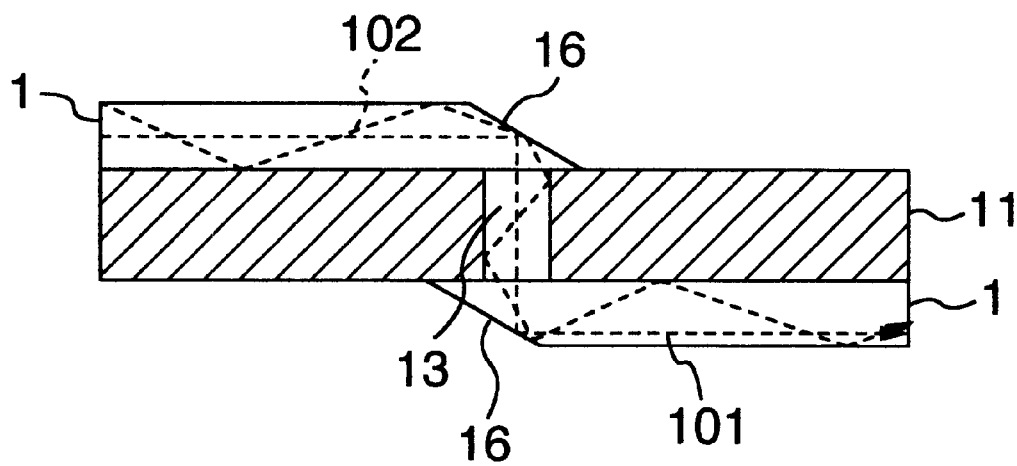
FIG. 2 is a schematic sectional view for illustrating the principle of the second aspect of the present invention.

The optical circuit substrate of the present invention is an optical circuit substrate comprising optical fibers 1 placed and fixed in the form of a circuit on both surfaces of a substrate 11, wherein each end part of the optical fibers 1 is cut so as to have an angle which permits refraction or reflection of light most in the direction of approximately 90 degrees relative to the surface of the substrate 11, said substrate having holes 13 therethrough beneath the cut-section 16 of the fiber and, as shown in FIG. 2, the cut-section 16 of the optical fiber 1 being provided on both surfaces of at least one hole 13 of the holes 13.

The hole 13 provided beneath the cut-section 16 of the optical fiber 1 is the hole 13 which serves for connecting an optical circuit. Light is reflected or refracted at the end part of the optical fiber, which has been cut at an angle which permits refraction or reflection of light most in the direction of approximately 90 degrees, to be introduced into a hole 13 which is perpendicular to the optical fiber 1 and, in the case shown in FIG. 2, can be used, through at least one hole 13 of the holes 13, for sending and receiving light between the optical fibers 1 provided on the both surfaces of the hole.

Such an optical substrate may be prepared, for example, by making a hole 13 which passes through a substrate, placing and fixing an optical fiber 1 in the form of a circuit on one surface of the substrate 11, cutting the end part of the optical fiber 1 at the place of the hole 13 provided previously so as to have an angle which permits refraction or reflection of light most in the direction of approximately 90 degrees relative to the surface of the substrate 11, placing and fixing optical fiber 1 in the form of a circuit on the other surface of the substrate 11, and cutting the end part of the optical fiber 1 at the place of at least one hole 13 of the holes 13 provided previously so as to have an angle which permits refraction or reflection of light most in the direction of approximately 90 degrees relative to the surface of the substrate 11.

The optical substrate may also be prepared by making a hole 13 which passes through the substrate 11, then, while placing an optical fiber 1 in the form of a circuit on one surface of the substrate 11, cutting an end part of the optical fiber 1 so as to fix the resulting cut-section 16 just above the hole 13 provided previously and to have an angle which permits refraction or reflection of light most in the direction of approximately 90 degrees relative to the surface of the substrate 11 and then, while placing an optical fiber 1 in the form of a circuit on the other surface of the substrate 11, cutting an end part of the optical fiber 1 at the place of at least one hole 13 of the holes 13 provided previously so as to have an angle which permits refraction or reflection of light most in the direction of approximately 90 degrees relative to the surface of the substrate 11.

The optical substrate may further be prepared by placing and fixing an optical fiber 1 in the form of a circuit on one surface of a substrate 11, cutting an end part of the optical fiber 1 so as to have an angle which permits refraction or reflection of light most in the direction of approximately 90 degrees relative to the surface of the substrate 11, providing holes beneath the cut-section of the optical fiber 1 from the back side of the substrate 11, placing and fixing an optical fiber 1 in the form of a circuit on the other surface of the substrate 11, and cutting an end part of the optical fiber 1 at the place of at least one hole 13 of the holes 13 provided previously so as to have an angle which permits refraction or reflection of light most in the direction of approximately 90 degrees relative to the surface of the substrate 11.

Still further, the optical substrate may be prepared by, while placing an optical fiber 1 in the form of a circuit on one surface of a substrate 11, cutting an end part of the optical fiber 1 so as to fix the resulting cut-section 16 just above a hole 13 to be provided later and to have an angle which permits refraction or reflection of light most in the direction of approximately 90 degrees relative to the surface of the substrate 11, providing holes 13 beneath the cut-section 16 of the optical fiber 11 from the back side of the substrate 11 and then, while placing an optical fiber in the form of a circuit on the other surface of the substrate 11, cutting an end part of the optical fiber 1 at the place of at least one hole 13 of the holes 13 provided previously so as to have an angle which permits refraction or reflection of light most in the direction of approximately 90 degrees relative to the surface of the substrate 11.

Third Aspect of the Invention

The process for the preparation of an optical circuit substrate of the present invention comprises placing and fixing an optical fiber in the form of a circuit on a surface of a flexible base material, extending the optical fiber outside the flexible base material simultaneously, intersecting the extended optical fiber outside the flexible base material with an optical fiber fixed to another rigid substrate, and connecting both fibers by applying a light-transmittable adhesive to the intersecting point of both fibers.

The optical circuit substrate may also be prepared by laying a flexible base material on a rigid substrate fixing an optical fiber thereon, placing an optical fiber in the form of a circuit on the surface of the flexible base material while extending the optical fiber outside the flexible base material to the rigid substrate and fixing thereon, intersecting the extended optical fiber outside the flexible base material with the optical fiber fixed from the beginning, and connecting both fibers by applying a light-transmittable adhesive to the intersecting point of both fibers.

Further, the optical circuit substrate may be prepared by placing and fixing an optical fiber in the form of a circuit on a surface of a flexible base material, laying the optical fiber on the flexible base material on an optical fiber fixed on another rigid substrate so as to directly contact with each other and intersect both optical fibers, and connecting both fibers by applying a light-transmittable adhesive to the intersecting point of both fibers.

Further, the optical circuit substrate may be prepared by placing and fixing an optical fiber in the form of a circuit on a surface of a flexible base material having holes in the portions to be connected, laying the flexible base material and a rigid substrate one upon another, intersecting an optical fiber fixed on the rigid substrate and the optical fiber provided on the flexible base material, and connecting both fibers by applying a light-transmittable adhesive to the intersecting point of both fibers.

Further, the optical circuit substrate may be prepared by placing and fixing an optical fiber in the form of a circuit on a surface of a flexible base material, extending the optical fiber outside the flexible base material, intersecting the extended optical fiber outside the flexible base material with an optical fiber fixed on another flexible substrate, and connecting the two fibers by applying a light-transmittable adhesive to the intersecting point of the fibers.

Further, the optical circuit substrate may be prepared by laying a flexible base material on a flexible substrate fixing an optical fiber thereon, placing an optical fiber in the form of a circuit on the surface of the flexible base material, extending the optical fiber outside the flexible base material and fixing the optical fiber on the flexible substrate, intersecting the extended optical fiber outside the flexible base material with the optical fiber fixed from the beginning, and connecting the two fibers by applying a light-transmittable resin to the intersecting point of the fibers.

Further, the optical circuit substrate may be prepared by placing and fixing an optical fiber in the form of a circuit on a surface of a flexible base material, laying an optical fiber fixed on another flexible substrate and the optical fiber provided on the flexible base material one upon another so as to directly contact the two optical fibers and to intersect both fibers, and connecting the two fibers by applying a light-transmittable adhesive to the intersecting point of the fibers.

Further, the optical circuit substrate may be prepared by placing and fixing an optical fiber in the form of a circuit on a surface of a flexible base material having holes in the portions to be connected, laying the flexible base material and another flexible substrate one upon another, intersecting an optical fiber fixed on the flexible substrate and the optical fiber provided on the flexible base material, and connecting the two fibers by applying a light-transmittable adhesive to the intersecting point of the fibers.

In the present invention, for making two optical fibers intersect with each other and applying a light-transmittable adhesive to the intersecting point, the adhesive may be made into the form of a sheet beforehand, then interposed between the optical fibers to be connected, and pressure or heat or both are applied thereto, whereby the optical fibers can be connected with each other. Alternately, the connection of the fibers may be achieved by applying a light-transmittable adhesive through dropwise addition using a dispenser.

The portion where the fibers are to be intersected with each other is preferably an end portion of each of the optical fibers.

The light-transmittable adhesives which may be used are, for example, deuterated polyimide resin, deuterated epoxy resin, deuterated acrylic resin, fluorinated polyimide resin, fluorinated epoxy resin, and fluorinated acrylic resin. Depending on the wavelength and the kind of optical fiber, conventional polyimide resin, epoxy resin and acrylic resin may also be used after properly selected by determining beforehand the loss caused when it is used for connection.
Fourth Aspect of the Invention The process for the connection of optical circuits of the present invention comprises making two plastics-made optical fibers intersect with each other and connecting the two fibers by applying pressure to the intersecting point while applying energy by vibration to the point.

The pressure applied in the above procedure is preferably decreased when the plastics-made optical fiber begins to deform, because the optical fiber can be prevented from collapsing.

In this process, the portion where the fibers are to be intersected is preferably an end portion of each of the optical fibers.

In this process, the energy by vibration used may be energy by ultrasonic vibration and energy by laser beams. Energy by vibration is converted to heat by application of ultrasonic vibration to the plastics-made optical fiber, and softens and melts the plastics-made optical fiber.

By using this process, an optical circuit substrate may be prepared by placing and fixing plastics-made optical fiber in the form of a circuit on a surface of a flexible base material, the plastics-made optical fiber being provided so as to extend outside the flexible base material, intersecting a plastics-made optical fiber fixed on another rigid substrate with the plastics-made optical fiber provided above so as to extend outside the flexible base material, and connecting the two fibers by applying pressure to the intersecting point of the fibers while applying energy by vibration to the point.

The optical circuit substrate may also be prepared by laying a flexible base material on a rigid substrate fixing a plastics-made optical fiber thereon, placing a plastics-made optical fiber in the form of a circuit on the surface of the flexible base material, extending the plastics-made optical fiber outside the flexible base material while fixing the fiber on the rigid substrate, intersecting the plastics-made optical fiber fixed from the beginning with the extended plastics-made optical fiber provided outside the flexible base material, and connecting the two fibers by applying pressure to the intersecting point of the fibers while applying energy by vibration to the point.

Further, the optical circuit substrate may be prepared by placing and fixing a plastics-made optical fiber in the form of a circuit on a surface of a flexible base material, laying a plastics-made optical fiber fixing on another rigid substrate and the plastics-made optical fiber provided on the flexible base material one upon another so as to directly contact the plastics-made optical fibers and to intersect each other, and connecting the two fibers by applying pressure to the intersecting point of the fibers while applying energy by vibration to the point.

Further, the optical circuit substrate may be prepared by placing and fixing a plastics-made optical fiber in the form of a circuit on a surface of a flexible base material having holes in the portions to be connected, laying the flexible base material and a rigid substrate one upon another, intersecting a plastics-made optical fiber fixed on the rigid substrate and the plastics-made optical fiber provided on the flexible base material intersect with each other, and connecting the two fibers by applying pressure to the intersecting point of the fibers while applying energy by vibration to the point.

Further, the optical circuit substrate may be prepared by placing and fixing a plastics-made optical fiber in the form of a circuit on a surface of a flexible base material, extending the plastics-made optical fiber outside the flexible base material, intersecting a plastics-made optical fiber fixed on another flexible substrate with the plastics-made optical fiber provided outside the flexible base material, and connecting the two fibers by applying pressure to the intersecting point of the fibers while applying energy by vibration to the point.

Further, the optical circuit substrate may be prepared by laying a flexible base material on a flexible substrate fixing a plastics-made optical fiber thereon, placing an optical fiber in the form of a circuit on the surface of the flexible base material, while extending the plastics-made optical fiber outside the flexible base material, fixing the extended optical fiber on the flexible substrate, intersecting the plastics-made optical fiber fixed from the beginning with the plastics-made optical fiber provided outside the flexible base material, and connecting the two fibers by applying pressure to the intersecting point of the fibers while applying energy by vibration to the point.

Further, the optical circuit substrate may be prepared by placing a plastics-made optical fiber in the form of a circuit on a surface of a flexible base material, laying a plastics-made optical fiber fixed on another flexible substrate and the plastics-made optical fiber provided on the flexible base material one upon another so as to directly contact the plastics-made optical fibers each other, intersecting the plastics-made optical fibers each other, and connecting the two fibers by applying pressure to the intersecting point of the fibers while applying energy by vibration to the point.

Further, the optical circuit substrate may be prepared by placing and fixing a plastics-made optical fiber in the form of a circuit on a surface of a flexible base material having holes in the portions to be connected, laying the flexible base material and another flexible substrate one upon another, intersecting a plastics-made optical fiber fixed on the flexible substrate and the plastics-made optical fiber provided on the flexible base material each other, and connecting the two fibers by applying pressure to the intersecting point of the fibers while applying energy by vibration to the point.

In the present invention, the methods used for making two plastics-made optical fibers intersect with each other and applying energy by vibration to the intersecting point include the use of ultrasonic vibration and the use of laser beams. With regard to ultrasonic vibration, there may be used, for example, a method which employs a bonding apparatus used in wire bonding, particularly in wedge bonding; in addition thereto, there may also be used an ultrasonic vibrating needle, which is used in the head part of a wiring machine employed, in preparing multi-wire wiring boards, in fixing insulated wire to the insulating base material coated with an adhesive.

The second method employed for applying the energy is a laser, which may be an infrared laser or eximer laser but, to suppress the adverse thermal influence, laser beams with a short pulse and high energy density per unit time are suitably used.

The application of pressure with simultaneous application of energy may be effected, as a simple and easy means, by applying energy while pressing the part with a finger. However, in order to keep operation conditions constant or to control the time necessary for preparation, it is necessary to prepare a jig for exclusive use, for example, a spatula provided at the tip with a groove for keeping the optical fiber fixed.

The present invention is described in more detail below with reference to the following Examples.

EXAMPLE 1

Polyimide film of 70 μm in thickness was used as a substrate. An acrylic rubber-based adhesive film was sticked to one side of the substrate and a multi-mode quartz optical fiber 125 μm in diameter was laid thereon by using a pressure-bonding jig utilizing ultrasonic vibration and an X-Y table of NC drive.

An amide-epoxy photosensitive resin which retains flexibility after cure was coated in a thickness of 100 μm on the surface having the fiber laid thereon obtained above, then defoamed under vacuum and cured by ultraviolet light.

The above-mentioned operation of forming a photosensitive resin layer was repeated twice to form a protective fixing layer for the fiber.

Then, the signal take-out region of the optical fiber was cut with a dicing saw from the surface till the bottom of the optical fiber to obtain a cut-section of the optical fiber having an angle of 45 degrees.

On the surface thereof was laminated a film for plating resist, HW-440 (a trade name, mfd. by Hitachi Chemical Co., Ltd.).

Thereafter, an infrared laser beam was irradiated from the back side of the substrate to make a hole 0.3 mm in diameter until it reached the optical fiber.

Then, a plating catalyst was attached to the inner wall of the hole and to the surface of the plating resist, and the plating resist was peeled off.

The substrate having the hole made therethrough was dipped in a nickel plating solution, Blue Shumer (a trade name, mfd. by Japan Kanizen Co., Ltd.), at 85° C. for 20 minutes to obtain a nickel plating 5 μm in thickness.

Then, a U-shaped cut was formed on the substrate with a cutter knife so as to surround the cut fiber, whereby a flexible optical fiber wiring substrate was obtained.

EXAMPLE 2

The surface copper foil of a glass cloth epoxy resin double-sided copper-plated laminate 0.25 mm in thickness, MIL-E-679 (a trade name, mfd. by Hitachi Chemical Co., Ltd.), was removed by etching using a known subtractive process. Then, a hole 5 mm in diameter was provided beforehand in the substrate region corresponding to the signal take-out region of optical fiber, and epoxy resin was filled in the hole by casting and then cured, to obtain a substrate.

Then, acrylic rubber-based adhesive film was sticked onto one side of the substrate, and multi-mode quartz optical fiber 125 μm in diameter was laid thereon by using a pressure-bonding jig which utilizes ultrasonic vibration and an X-Y table of NC drive.

An epoxy prepreg was laid on the top of the surface having the fiber laid thereon and heat-cured by means of cushion pressing, to obtain a protective fixing layer for the fiber.

Then the signal take-out region of the optical fiber was cut with a dicing saw from the surface to the bottom of the optical fiber to obtain a cut-section of the optical fiber having an angle of 45 degrees.

On the surface thereof was laminated a film for plating resist, HW-440 (a trade name, mfd. by Hitachi Chemical Co., Ltd.).

Thereafter, an infrared laser beam was irradiated from the back side of the substrate to make a hole 0.3 mm in diameter until it reached the optical fiber.

Then, a plating catalyst was attached to the inner wall of the hole and to the plating resist surface, and the plating resist was peeled off.

The substrate having the hole made therethrough was dipped in a nickel plating solution, Blue Shumer (a trade name, mfd. by Japan Kanizen Co., Ltd.), at 85° C. for 20 minutes to obtain a nickel plating of 5 μm in thickness.

Further, a fluorine-containing type epoxy resin was filled in the hole thus nickel-plated to swell above the substrate surface to such an extent as to become roundish owing to surface tension, and was cured by irradiation of ultraviolet light to obtain an optical fiber wiring substrate.

EXAMPLE 3

A flexible optical fiber wiring substrate was obtained wherein a light receiving and transmitting element was provided to the opening of the hole of the flexible optical fiber wiring substrate prepared in Example 1 which opening was not in contact with the optical fiber, such that the light input-output site of the element might be in alignment and the opening.

EXAMPLE 4

A flexible optical fiber wiring substrate was obtained in the same manner as in Example 1 except that the cut-section of the optical fiber was polished by blasting alumina powder, an abrasive, then polished by buffing and washed with a diluted solvent to obtain specular finishing.

EXAMPLE 5

An optical fiber wiring substrate was obtained in the same manner as in Example 2 except that, after the signal light transmittable resin had been filled in the hole, a convex lens was adhered to the opening part of the hole which was not in contact with the optical fiber.

EXAMPLE 6

An optical fiber wiring substrate was obtained in the same manner as in Example 2 except that a photosensitive resin sheet was used as the substrate and the hole was formed by light exposure and development.

EXAMPLE 7

An optical fiber wiring substrate was obtained in the same manner as in Example 2 except that two kinds of light-transmittable resins were used, the diameter of the first hole was changed to 1.0 mm, the hole was filled with a light-transmittable resin having a low refractive index, the resin was cured by heating, then a hole 0.3 mm in diameter was made through the center of the original hole, and a light-transmittable resin having a high refractive index was filled therein.

EXAMPLE 8

Polyimide film 70 μm in thickness was used as the substrate. An acrylic rubber-based adhesive was sticked to one side of the substrate and a multi-mode quartz optical fiber 125 μm in diameter was laid thereon by using a pressure-bonding jig utilizing ultrasonic vibration and an X-Y table of NC drive.

An amide-epoxy photosensitive resin which retains flexibility after cure was coated in a thickness of 100 μm on the surface having the fiber laid thereon obtained above, then defoamed under vacuum and cured by ultraviolet light.

The above-mentioned operation of forming a photosensitive resin layer was repeated twice to form a protective fixing layer for the fiber.

Then, the signal take-out region of the optical fiber and the place at which the lights from the optical fibers of the both surfaces are to be exchanged were cut with a dicing saw from the surface to the bottom of the optical fiber to obtain a cut-section of the optical fiber having an angle of approximately 45 degrees.

Thereafter, an infrared laser beam was irradiated from the back side of the substrate to make a hole 0.3 mm in diameter until it reached the optical fiber.

Further, a U-shaped cut was formed on the substrate with a cutter knife so as to surround the cut fiber.

Then, an acrylic rubber-based adhesive film was sticked to the back side of the substrate, and a multi-mode quartz optical fiber 125 μm in diameter was laid thereon by using a pressure-bonding jig utilizing ultrasonic vibration and an X-Y table of NC drive.

Then, an amide-epoxy photosensitive resin which retains flexibility after cure was coated in a thickness of 100 μm on the surface having the fiber laid thereon obtained above, then defoamed under vacuum and cured by ultraviolet light.

The above-mentioned operation of forming a photosensitive resin layer was repeated twice to form a protective fixing layer for the fiber.

Then, the signal take-out region of the optical fiber and the place at which the light from the optical fiber laid on the front side is to be exchanged were cut with a dicing saw from the surface to the bottom of the optical fiber to obtain a cut-section of the optical fiber having an angle of approximately 45 degrees.

Thereafter, a U-shaped cut was formed on the substrate with a cutter knife so as to surround the cut fiber, whereby a flexible optical fiber double-sided wiring substrate was obtained.

EXAMPLE 9

The surface copper foil of a glass cloth-epoxy resin double-sided copper-plated laminate 0.25 mm in thickness, MIL-E-679 (a trade name, mfd. by Hitachi Chemical Co., Ltd.), was removed by etching using a known subtractive process. Then, holes 5 mm in diameter were provided beforehand in the signal take-out region of the optical fiber and in the substrate region corresponding to the place at which the lights from the optical fibers of the both surfaces are to be exchanged, then the holes were filled with epoxy resin by casting and the resin was cured to obtain a substrate.

Then, acrylic rubber-based adhesive film was sticked to one side surface of the substrate, and a multi-mode quartz optical fiber 125 μm in diameter was laid thereon by using a pressure-bonding jig utilizing ultrasonic vibration and an X-Y table of NC drive.

An epoxy prepreg was laid on the top of the surface having the fiber laid thereon obtained above and heat-cured by means of cushion pressing to obtain a protective fixing layer for the fiber.

Then, the signal take-out region of the optical fiber and the portion at which the lights from the optical fibers of the both sides are to be exchanged were cut with a dicing saw from the surface to the bottom of the optical fiber to obtain a cut-section of the optical fiber having an angle of approximately 45 degrees.

Thereafter, an infrared laser beam was irradiated from the back side of the substrate to make a hole 0.3 mm in diameter until it reached the optical fiber.

Further, in the hole of the place at which light is taken out, the hole formed by the laser was filled with a fluorine-containing type epoxy resin such that the resin swelled above the substrate surface to an extent of becoming roundish owing to surface tension, and the resin was cured by irradiation of ultraviolet light.

Then, acrylic rubber-based adhesive film was sticked to the other side surface of the substrate, and a multi-mode quartz optical fiber 125 μm in diameter was laid thereon by using a pressure-bonding jig utilizing ultrasonic vibration and an X-Y table of NC drive.

An epoxy prepreg was laid on the top of the surface having the fiber laid thereon obtained above and heat-cured by means of cushion pressing, to form a protective fixing layer of the fiber.

Then, the signal take-out region of the optical fiber and the place at which the lights from the optical fibers of the both sides are to be exchanged were cut with a dicing saw from the surface to the bottom of the optical fiber to obtain a cut-section of the optical fiber having an angle of approximately 45 degrees, whereby an optical fiber double-sided wiring substrate was obtained.

EXAMPLE 10

A flexible optical fiber double-sided wiring substrate was obtained by providing a light receiving and transmitting element to the opening of the hole of the flexible optical fiber wiring substrate prepared in Example 8 which opening was not in contact with the optical fiber, such that the element might be in alignment with the opening.

EXAMPLE 11

An optical fiber double-sided wiring substrate was obtained in the same manner as in Example 8 except that the cut-section of the optical fiber was polished by blasting alumina powder, an adhesive, then polished by buffing and washed with a diluted solvent to obtain specular finishing.

EXAMPLE 12

An optical fiber double-sided wiring substrate was obtained in the same manner as in Example 9 except that, after the signal light transmittable resin had been filled in the hole, a convex lens was adhered to the opening part of the hole which was not in contact with the optical fiber.

EXAMPLE 13

An optical fiber double-sided wiring substrate was obtained in the same manner as in Example 9 except that a photosensitive resin sheet was used as the substrate and the hole was formed by light exposure and development.

EXAMPLE 14

An optical fiber double-sided wiring substrate was obtained in the same manner as in Example 9 except that two kinds of light-transmittable resins were used, the diameter of the first hole was changed to 1.0 mm, the hole was filled with a light-transmittable resin having a low refractive index, the resin was cured by heating, then a hole 0.3 mm in diameter was made through the center of the original hole, and a light-transmittable resin having a high refractive index was filled therein.

EXAMPLE 15

Polyimide film 70 μm in thickness was used as a base material. An acrylic rubber-based adhesive film was sticked to one side of the base material, and a multi-mode quartz optical fiber 125 μm in diameter was laid thereon in the form of a circuit by using a pressure-bonding jig utilizing ultrasonic vibration and an X-Y table of NC drive, the optical fiber being extended farther outside than the external shape of the base material, to be used as a flexible base material.

The unnecessary part of the surface copper foil of a glass cloth-epoxy resin double-sided copper-plated laminate, MIL-E-679 (a trade name, mfd. by Hitachi Chemical Co., Ltd.), was removed by etching to form a circuit, then an IC chip, chip resistor, chip condenser, chip transistor, and the like were mounted, an acrylic rubber based adhesive film which has holes provided at the places corresponding to the electronic parts mounted above was sticked thereto, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber.

Then a laser light receiving element was attached to that side of the hole to which optical fiber had not been fixed, and connected with the circuit of the front side surface, to obtain a rigid substrate.

Figure 3:
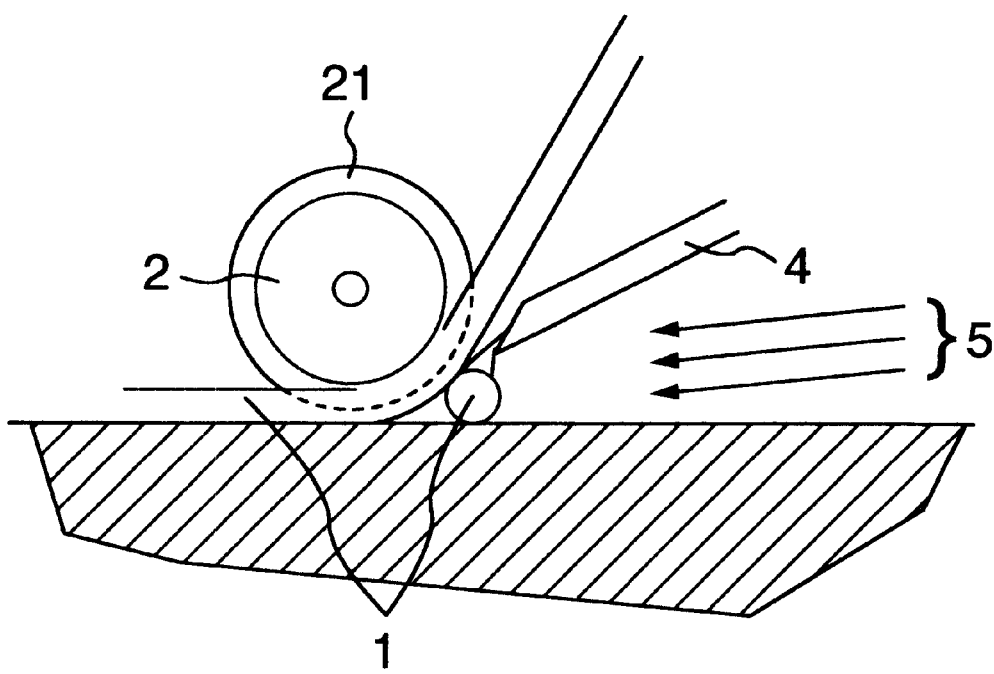
FIG. 3 is a sectional view for illustrating a jig used in the Examples of the third and the fourth aspects of the present invention.

The flexible base material was laid on the top of the rigid substrate thus prepared, the optical fiber fixed to the rigid substrate and the optical fiber provided to extend farther outside than the flexible base material were ade to intersect with each other and, as shown in FIG. 3, while the intersecting place was being pressed with a pressure-bonding device 2 having a groove 21, a fluorinated polyimide resin type adhesive was applied to the intersecting point of the fibers by means of a dispenser 4, and after the dispenser 4 had been moved to prevent the tip of the dispenser 4 being clogged by hot air, the two optical fibers 1 were fixed by blowing hot air 5 with a fan.

An amide-epoxy photosensitive resin which retains flexibility after cure was coated in a thickness of 100 μm on the surface having the optical fiber laid thereon obtained above, then defoamed under vacuum, and cured by ultraviolet light.

The above-mentioned operation of forming a photosensitive resin layer was repeated twice to form a protective fixing layer for the fiber. Thus, an optical circuit substrate which has a fiber extension part using a flexible base material was prepared.

EXAMPLE 16

Polyimide film 70 μm in thickness was used as a base material. An acrylic rubber-based adhesive film was sticked to one side of the base material and a multi-mode quartz optical fiber 125 μm in diameter was laid thereon in the form of a circuit by using a pressure-bonding jig utilizing ultrasonic vibration and an X-Y table of NC drive, the optical fiber being extended farther outside than the external shape of the base material, to obtain a flexible base material.

The unnecessary part of the surface copper foil of a double-sided copper-coated flexible film which used polyimide film 70 μm in thickness as the base material was removed by etching to form a circuit, then an IC chip, chip resistor, chip condenser, chip transistor, and the like were mounted, an acrylic rubber based adhesive film which had holes provided at the places corresponding to the electronic parts mounted above was sticked thereto, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber.

Then, a laser light receiving element was attached to that side of the hole to which optical fiber had not been fixed, and was connected with the circuit of the front side surface, to obtain a flexible substrate.

The flexible base material was laid on the top of the flexible substrate thus prepared, the optical fiber fixed to the flexible substrate and the optical fiber provided to extend farther outside than the flexible base material were made to intersect with each other and, as shown in FIG. 3, while the intersecting place was being pressed with a pressure-bonding device 2 having a groove 21, a deuterated epoxy resin type adhesive was applied to the intersecting point by means of a dispenser 4, and after the dispenser 4 had been moved to prevent the tip of the dispenser 4 being clogged by hot air, the two optical fibers 1 were fixed by blowing hot air 5 with a fan.

An amide-epoxy photosensitive resin which retains flexibility after cure was coated in a thickness of 100 μm on the surface having the optical fiber laid thereon obtained above, then defoamed under vacuum, and cured by ultraviolet light.

The above-mentioned operation of forming a photosensitive resin layer was repeated twice to form a protective fixing layer for the fiber. Thus, an optical circuit substrate which has a fiber extension part using a flexible base material was prepared.

EXAMPLE 17

Polyimide film 70 μm in thickness was used as a base material. An acrylic rubber-based adhesive film was sticked to one side of the base material, and a multi-mode quartz optical fiber 125 μm in diameter was laid thereon in the form of a circuit by using a pressure-bonding jig utilizing ultrasonic vibration and an X-Y table of NC drive, the optical fiber being extended farther outside than the external shape of the base material, to obtain a flexible base material.

The unnecessary part of the surface copper foil of a glass cloth-epoxy resin double-sided copper-plated laminate 0.8 mm in thickness, MIL-E-679 (a trade name, mfd. by Hitachi Chemical Co., Ltd.), was removed by etching to form a circuit, then an IC chip, chip resistor, chip condenser, chip transistor, and the like were mounted, an acrylic rubber based adhesive film which had been provided with holes at the places corresponding to the electronic parts mounted above was sticked thereto, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber.

Then, a laser light receiving element was attached to that side of the hole to which the optical fiber had not been fixed, and was connected with the circuit of the front side surface, to obtain a rigid substrate.

The flexible base material was laid on the top of the rigid substrate thus prepared, with a fluorinated polyimide resin type adhesive interposed therebetween, in alignment such that the optical fibers might contact directly with each other, the optical fiber fixed to the rigid substrate and the optical fiber laid on the flexible base material were made to intersect with each other, and the two optical fibers were connected and fixed through the medium of polyimide film by application of heat and pressure.

Since the flexible base material lies on the top of the surface having the fiber placed thereon, an optical circuit which has a fiber extension part using a flexible base material was obtained without forming a protective film.

EXAMPLE 18

An optical circuit substrate which has a fiber extension part using a flexible base material was prepared in the same manner as in Example 17 except that a flexible base material provided beforehand with a hole at the place where connection was to be made was used and the connection of the optical fiber was conducted at the place of the hole provided to the flexible base material.

EXAMPLE 19

The unnecessary part of the surface copper foil of a glass cloth-epoxy resin double-sided copper-plated laminate 0.8 mm in thickness, MIL-E-679 (a trade name, mfd. by Hitachi Chemical Co., Ltd.), was removed by etching to form a circuit.

An acrylic rubber-based adhesive film was sticked to the substrate having the circuit formed thereon obtained above, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber to obtain a rigid substrate.

A fluorinated acrylic resin type adhesive was coated on the surface of the substrate having the optical fiber laid thereon, then heated and dried to become a semicured state.

On the top of the surface thus coated was laid a polyimide film (flexible) base material 70 $\mu$m in thickness having an acrylic rubber based adhesive film thereon in a manner wherein the acrylic rubber based adhesive film might not contact with the surface of the rigid substrate, and only the places at which they lied one upon another were heated to effect bonding and fixing; then, by using a pressure-bonding jig utilizing ultrasonic vibration and an X-Y table of NC drive (hereinafter referred to simply as "wiring machine"), a multi-mode quartz optical fiber 125 $\mu$m in diameter was laid, while the fiber was being fed from an optical fiber feed guide, by activating the acrylic rubber based adhesive film through application of energy by vibration, in the form of a circuit; the optical fiber was extended farther outside than the flexible base material, then made to intersect with the optical fiber fixed to the above-mentioned rigid substrate from the beginning and, as shown in FIG. 3, while the intersecting place was being pressed with a pressure-bonding device 2 having a groove 21, a deuterated epoxy resin type adhesive was applied to the intersecting point by using a dispenser 4 and, after the dispenser 4 had been moved to prevent the tip of the dispenser 4 being clogged by hot air, the two optical An amide-epoxy photosensitive resin which retains flexibility after cure was coated in a thickness of 100 $\mu$m on the surface having the optical fiber laid thereon obtained above, then defoamed under vacuum and cured by ultraviolet light.

The above-mentioned operation of forming a photosensitive resin layer was repeated twice to form a protective fixing layer for the fiber.

Thereafter, an IC chip, chip resistor, chip condenser, chip transistor, and the like were mounted, and a light receiving element was attached to the hole which had been made from the back side as mentioned above. Thus, an optical circuit substrate having a fiber extension part using a flexible base material was obtained.

EXAMPLE 20

Polyimide film 70 $\mu$m in thickness was used as a base material. An acrylic rubber-based adhesive film was sticked to one side of the base material, and a plastics-made optical fiber 125 $\mu$m in diameter was laid thereon in the form of a circuit by using a pressure-bonding jig and an X-Y table of NC drive, the optical fiber being extended farther outside than the external shape of the base material, to obtain a flexible base material.

The unnecessary part of the surface copper foil of a glass cloth-epoxy resin double-sided copper-plate laminate 0.8 mm in thickness, MIL-E-679 (a trade name, mfd. by Hitachi Chemical Co., Ltd.), was removed by etching to form a circuit, then an IC chip, chip resistor, chip condenser, chip transistor, and the like were mounted, an acrylic rubber based adhesive film which had been provided with holes at the places corresponding to the electronic parts mounted above was sticked thereto, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber.

Then, a laser light receiving element was attached to that side of the hole to which the optical fiber had not been fixed, and was connected with the circuit of the front side surface.

The flexible base material and the rigid substrate thus prepared were laid one upon another, the optical fiber fixed to the rigid substrate and the optical fiber provided to extend farther outside than the flexible base material were made to intersect with each other and, as shown in FIG. 3, while the intersecting place was being pressed and melt-bonded with a pressure-bonding device 2 which vibrates ultrasonically, a fluorinated polyimide resin type adhesive was applied to the intersecting point by using a dispenser 4 and, after the dispenser 4 had been moved to prevent the tip of the dispenser 4 being clogged 5 by hot air, the two optical fibers 1 were fixed by blowing hot air 5 with a fan.

An amide-epoxy photosensitive resin which retains flexibility after cure was coated in a thickness of 100 $\mu$m on the surface having the optical fiber laid thereon obtained above, then defoamed under vacuum and cured by ultraviolet light.

The above-mentioned operation of forming a photosensitive resin layer was repeated twice to form a protective fixing layer for the fiber. Thus, an optical circuit substrate having a fiber extension part using a flexible base material was obtained.

EXAMPLE 21

Polyimide film 70 µm in thickness was used as a base material. An acrylic rubber-based adhesive film was sticked to one side of the base material, and a plastics-made optical fiber 125 µm in diameter was laid thereon in the form of a circuit by using a pressure-bonding jig utilizing ultrasonic vibration and an X-Y table of NC drive, the optical fiber being extended farther outside than the external shape of the base material, to obtain a flexible base material.

The unnecessary part of the surface copper foil of a double-sided copper-plated flexible film which used polyimide film 70 µm in thickness as the base material was removed by etching to form a circuit. Then, an IC chip, chip resistor, chip condenser, chip transistor, and the like were mounted, an acrylic rubber-based adhesive film having holes provided at the places corresponding to the electronic parts mounted above was sticked thereto, and optical fiber was placed and fixed thereon.

Then, the signal take-out region of the optical fiber was cut with a dicing saw from the surface to the bottom of the optical fiber, to obtain a cut-section of the optical fiber having an angle of 45 degrees. Thereafter, an infrared laser beam was irradiated from the back side of the substrate to make a hole 0.3 mm in diameter until it reached the optical fiber.

A laser light receiving element was attached to that side of the hole to which the optical fiber had not been fixed, and was connected with the circuit of the front side surface, to obtain a flexible substrate.

The flexible base material was laid on the top of the flexible substrate thus prepared, the optical fiber fixed to the flexible substrate and the optical fiber provided to extend farther outside than the flexible base material were made to intersect with each other and, as shown in FIG. 3, while the intersecting place was being pressed and melt-bonded with a pressure-bonding device 2 which has a groove 21 and vibrates ultrasonically, a fluorinated polyimide resin type adhesive was applied to the intersecting point by using a dispenser 4 and, after the dispenser 4 had been moved to prevent the tip of the dispenser 4 being clogged by hot air, the two optical fibers 1 were fixed by blowing hot air 5 with a fan.

An amide-epoxy photosensitive resin which retains flexibility after cure was coated in a thickness of 100 µm on the surface having the optical fiber laid thereon obtained above, was defoamed under vacuum and cured by ultraviolet light.

The above-mentioned operation of forming a photosensitive resin layer was repeated twice to obtain a protective fixing layer for the fiber. Thus, an optical circuit substrate having a fiber extension part using a flexible base material was obtained.

EXAMPLE 22

Polyimide film 70 µm in thickness was used as a substrate. An acrylic rubber-based adhesive film was sticked to one side of the substrate and a plastics-made optical fiber 125 µm in thickness was laid thereon in the form of a circuit by using a pressure-bonding jig utilizing ultrasonic vibration and an X-Y table of NC drive, the optical fiber being extended farther outside than the external shape of the base material, to obtain a flexible base material.

The unnecessary part of the surface copper foil of a glass cloth-epoxy resin double-sided copper-plated laminate 0.8 mm in thickness, MIL-E-679 (a trade name, mfd. by Hitachi Chemical Co., Ltd.), was removed by etching to form a circuit. Then, an IC chip, chip resistor, chip condenser, chip transistors, and the like were mounted, an acrylic rubber-based adhesive film having holes provided at the places corresponding to the electronic parts mounted above was sticked thereto, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber.

A laser light receiving element was attached to that side of the hole to which the optical fiber had not been fixed, and was connected with the circuit of the front side surface, to obtain a rigid substrate.

The flexible base material was laid on the top of the rigid substrate thus prepared, the optical fiber fixed to the rigid substrate and the optical fiber provided to extend farther outside than the flexible base material were made to intersect with each other and, as shown in FIG. 3, while the intersecting place was being pressed and melt-bonded with a pressure-bonding device 2 which vibrates ultrasonically and has a groove 21, a fluorinated polyimide resin type adhesive was applied to the intersecting point with a dispenser 4 and, after the dispenser 4 had been moved to prevent the tip of the dispenser 4 being clogged by hot air, the two optical fibers 1 were fixed by blowing hot air 5 with a fan.

Since the flexible base material lies on the top of the surface having the optical fiber placed thereon, an optical circuit substrate which has a fiber extension part using a flexible base material was obtained without forming a protective film.

EXAMPLE 23

Polyimide film 70 µm in thickness was used as a base material. An acrylic rubber-based adhesive film was sticked to one side of the substrate, and a plastics-made optical fiber 125 µm in diameter was laid thereon in the form of a circuit by using a pressure-bonding jig utilizing ultrasonic vibration and an X-Y table of NC drive, the optical fiber being extended farther outside than the external shape of the base material to be connected by means of a connector, to obtain a flexible base material.

The unnecessary part of the surface copper foil of a glass cloth-epoxy resin double-sided copper-plated laminate 0.8 mm in thickness, MIL-E-679 (a trade name, mfd. by Hitachi Chemical Co., Ltd.), was removed by etching to form a circuit. Then, an IC chip, chip resistor, chip condenser, chip transistor, and the like were mounted, an acrylic rubber based adhesive film having holes provided at the places corresponding to the electronic parts mounted above was sticked thereto, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber.

A laser light receiving element was attached to that side of the hole to which the optical fiber had not been fixed and was connected with the circuit of the front side surface, to obtain a rigid substrate.

The flexible base material was laid on the top of the rigid substrate thus prepared, then they were placed one upon another, with a fluorinated polyimide resin type adhesive therebetween, in alignment such that the optical fibers might come in direct contact with each other, the optical fiber fixed to the substrate and the optical fiber laid on the flexible base material were made to intersect with each other and, while the intersecting place was being pressed and melt-bonded by using a pressure-bonding device 2 which has a groove 21 and vibrates ultrasonically, as shown in FIG. 3, the two fibers 1 were connected and fixed, with polyimide film therebetween, by blowing hot air 5 with a fan.

Since the flexible base material lies on the top of the surface having optical fiber laid thereon, a multi-layer optical circuit substrate which has a fiber extension part to be connected to a connector which uses a flexible base material was obtained without forming a protective film.

EXAMPLE 24

The unnecessary part of the surface copper foil of a glass cloth-epoxy resin double-sided copper-plated laminate 0.8 mm in thickness, MIL-E-679 (a trade name, mfd. by Hitachi Chemical Co., Ltd.), was removed by etching to form a circuit.

To the substrate having the circuit formed thereon was sticked an acrylic rubber-based adhesive film, and optical fiber was placed and fixed thereon.

Then, the signal take-out region of the optical fiber was cut with a dicing saw from the surface to the bottom of the optical fiber to obtain a cut-section of the optical fiber having an angle of 45 degrees. Thereafter, an infrared laser beam was irradiated from the back side of the substrate to make a hole 0.3 mm in diameter until it reached the optical fiber, to obtain a rigid substrate.

Figure 4:
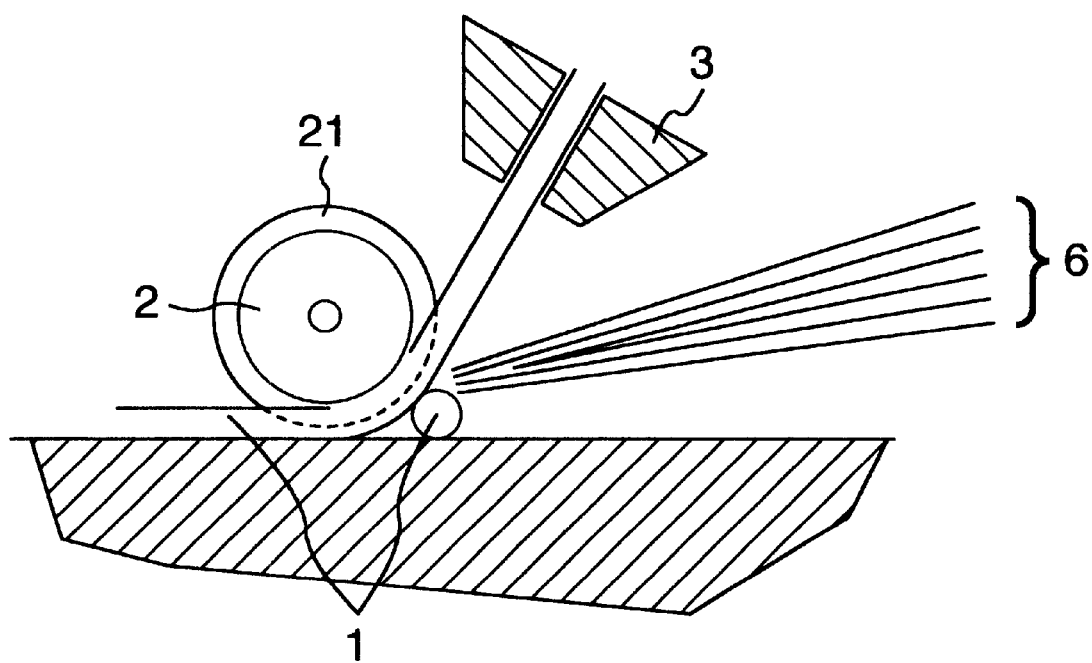
FIG. 4 is a sectional view for illustrating a jig used in the Example of the fourth aspect of the present invention.

To the surface of the substrate was sticked, with an adhesive, a polyimide film base material 70 μm in thickness having an acrylic rubber-based adhesive film sticked to one side of the base material, and while a plastics-made optical fiber 125 μm in diameter was being laid thereon in the form of a circuit by using a pressure-bonding jig utilizing ultrasonic vibration and an X-Y table of NC drive (hereinafter referred to as "wiring machine"), the optical fiber was extended to the outside of the flexible material and, while the fiber was being fixed to the rigid substrate, the optical fiber fixed from the beginning and the optical fiber provided to extend farther outside than the flexible base material were made to intersect with each other; then, to the intersecting point of the fibers was connected, as shown in FIG. 4, optical fiber 1 fed from an optical fiber feed guide 3 by irradiation of a laser light 6 while pressure was being applied thereto with a pressure-bonding device 2 having a groove 21.

An amide-epoxy photosensitive resin which retains flexibility after cure was coated in a thickness of 100 μm on the surface having the fiber laid thereon obtained above, then defoamed under vacuum and cured by ultraviolet light.

The above-mentioned operation of forming a photosensitive resin layer was repeated twice to form a protective fixing layer for the fiber.

Thereafter, an IC chip, chip resistor, chip condenser, chip transistor, or the like were mounted, and a light receiving element was attached to the hole provided from the back side described above. Thus, an optical circuit substrate which has a fiber extension part using a flexible base material was obtained.

EXAMPLE 25

An optical circuit substrate which has a fiber extension part using a flexible base material was prepared in the same manner as in Example 24 except that a flexible base material was laid on the top of a flexible substrate having a plastics-made optical fiber fixed thereto, and while a plastics-made optical fiber was being placed in the form of a circuit on the surface of the flexible base material, the optical fiber was extended to the outside of the flexible base material and, while the optical fiber was being fixed to the flexible base material, the optical fiber fixed from the beginning and the optical fiber provided to extend farther outside than the flexible base material were made to intersect with each other, and were connected by applying pressure to the intersecting point while applying energy by ultrasonic vibration thereto.

Industrial Applicability

As set forth above, according to the present invention, there can be prepared with good efficiency an optical circuit substrate that has an optical interconnection part which requires only a small area for optical connection and permits easy alignment between the optical element and the optical fiber, an optical circuit substrate which permits optical interconnection with a through-hole, an optical circuit substrate which permits the optical interconnection of optical fibers formed on the both surfaces with each other by using a through-hole, and an optical circuit substrate which permits the connection of optical fibers with each other on one side surface alone. These optical circuit substrates can be used effectively in communication instruments and the like.

What is claimed is:

1. An optical circuit substrate comprising an optical fiber placed and fixed in the form of a circuit on a surface of a substrate, wherein an end portion of the optical fiber is cut so as to have an angle which permits refraction or reflection of light most in the direction of 90 degrees relative to the substrate surface, and said substrate having a hole therethrough beneath the cut-section of the fiber, said hole having a metal film on the inner wall thereof, and wherein the hole provided beneath the cut-section of the optical fiber is filled with a light-transmittable resin.

2. The optical circuit substrate according to claim 1, wherein the substrate has on a side not contacting with the optical fiber a light receiving and transmitting element containing a light input and output part which is registered and connected to the hole beneath the cut-section of the optical fiber.

3. The optical circuit substrate according to claim 1 or 2, wherein the light-transmittable resin filled in the hole is composed of resins different in refractive index between the internal wall side and the central side of the hole, wherein the refractive index of the resin of the central side is higher than that of the resin of the internal wall side.

4. The optical circuit substrate according to claim 1 or 2, wherein the hole has a lens therein.

5. The optical circuit substrate according to claim 1 or 2, wherein the substrate has a conductor circuit on a surface of an insulating substrate or an internal layer circuit substrate insulation-treated with a prepreg.

6. The optical circuit substrate according to claim 1 or 2, wherein the substrate has a conductor circuit layer and an optical circuit layer separately.

7. The optical circuit substrate according to claim 6, wherein the substrate comprises a combination of a conductor circuit substrate and an optical circuit substrate.

8. The optical circuit substrate according to claim 1 or 2, wherein the substrate material is a resin film and the means for fixing the optical fiber is the use of an adhesive-coated resin film, adhesive resin film or photosensitive resin.

9. The optical circuit substrate according to claim 8, wherein, in the plane shape of the optical circuit substrate, a cut or a projection is formed, the optical fiber is laid continuously from the main portion of the optical circuit substrate to the portion surrounded by the said cut or to the projection, and the cut-section of the fiber is provided at the portion surrounded by the cut or at the projection.

10. A process for the preparation of an optical circuit substrate, which comprises making a hole which passes through a substrate, forming a metal film on the inner wall of the hole, placing and fixing an optical fiber in the form of a circuit on a surface of the substrate so as to be in contact therewith, and then cutting an end portion of the optical fiber at the place of the hole provided above so as to have an angle which permits refraction or reflection of light most in the direction of 90 degrees relative to the surface of the substrate.

11. A process for the preparation of an optical circuit substrate, which comprises making a hole which passes through a substrate, forming a metal film on an inner wall of the hole and then, while placing an optical fiber in the form of a circuit on a surface of the substrate so as to be in contact therewith, cutting an end portion of the optical fiber so as to fix just above the hole provided previously and to have an angle which permits refraction or reflection of light most in the direction of 90 degrees relative to the surface of the substrate.

12. A process for the preparation of an optical circuit substrate, which comprises placing and fixing an optical fiber in the form of a circuit on a surface of a substrate so as to be in contact therewith, cutting an end portion of the optical fiber at the place of a hole to be provided so as to have an angle which permits refraction or reflection of light most in the direction of 90 degrees relative to the surface of the substrate, then providing a hole beneath the cut-section of the optical fiber from the back side of the substrate, and forming a metal film on the inner wall of the hole.

13. A process for the preparation of an optical circuit substrate, which comprises placing and fixing an optical fiber in the form of a circuit on a surface of a substrate cutting an end portion of the optical fiber at the place of a hole to be provided so as to have an angle which permits refraction or reflection of light most in the direction of 90 degrees relative to the surface of the substrate, then providing a hole beneath the cut-section of the optical fiber from the back side of the substrate, and forming a metal film on the inner wall of the hole, wherein the hole is provided by boring a hole having a larger diameter than the final one, filling the hole with a resin capable of being bored with a laser beam, heat curing the resin and using a laser beam for providing the hole.

14. A process for the preparation of an optical circuit substrate, which comprises cutting an end portion of an optical fiber, while placing the optical fiber in the form of a circuit on a surface of a substrate so as to be in contact therewith, so as to be fixed just above a hole to be provided later and to have an angle which permits refraction or reflection of light most in the direction of 90 degrees relative to the surface of the substrate, providing the hole beneath the cut-section of the optical fiber from the back side of the substrate, and forming a metal film on the inner wall of the hole.

15. The process for the preparation of an optical circuit substrate according to claim 13, wherein the optical fiber is laid on a sticky film or an adhesive film provided on the substrate while feeding the optical fiber and subjecting to pressure bonding or heat-pressure bonding at fixing positions varied by means of an NC apparatus.

16. The process for the preparation of an optical circuit substrate according to claim 13 or 15, wherein the cut-section of the optical fiber is nearly specularly finished by treating it with an abrasive, hydrofluoric acid, borofluoric acid, or a solvent.

17. The process for the preparation of an optical circuit substrate according to claim 13 or 15, wherein the hole is provided by boring a hole, metallizing the inner wall thereof, and filling the hole with a signal light transmittable resin.

18. The process for the preparation of an optical circuit substrate according to claim 17, wherein the form of the surface of the signal light transmittable resin is controlled by the extent of filling of the resin.

19. The process for the preparation of an optical circuit substrate according to claim 18, wherein after filling the hole with the signal light transmittable resin, a lens is adhered to the opening of the hole not contacting with the optical fiber.

20. The process for the preparation of an optical circuit substrate according to claim 17, wherein, after filling the hole with the signal light transmittable resin, a light receiving and transmitting element is provided on the opening of the hole not contacting with the optical fiber by registering a light input and output site thereof with the hole.

21. The process for the preparation of an optical circuit substrate according to claim 13 or 15, wherein the hole is provided by using a laser.

22. The process for the preparation of an optical circuit substrate according to claim 13 or 15, wherein the substrate is obtained from a photosensitive resin sheet, and the hole is provided by light exposure and subsequent development.

23. The process for the preparation of an optical circuit substrate according to claim 13, wherein the hole is filled with two kinds of light-transmittable resins by filling first with a light-transmittable resin having a lower refractive index, boring a hole having a smaller diameter than the original hole, and filling the hole with a light-transmittable resin having a higher refractive index.

24. An optical circuit substrate comprising optical fibers placed and fixed in the form of a circuit on both sides of a substrate wherein each end portion of the optical fiber is cut so as to have an angle which permits refraction or reflection of light most in the direction of 90 degrees relative to the substrate surface, said substrate having a plurality of holes therethrough beneath the cut-section of the fiber, and at least one of the holes being provided with the cut-sections of the fibers on both sides.

25. The optical circuit substrate according to claim 24, wherein the hole provided beneath the cut-section of the optical fiber is filled with a light-transmittable resin.

26. The optical circuit substrate according to claim 24, wherein the substrate has on a side not contacting with the optical fiber a light receiving and transmitting element containing a light input and output part which is registered and connected to the hole provided beneath the cut-section of the optical fiber.

27. The optical circuit substrate according to any one of claims 24 to 26, wherein the hole is filled with light-transmittable resins different in refractive index between the inner wall side and the central side of the hole, wherein the refractive index of the resin of the central side is higher than that of the resin of the inner wall side.

28. The optical circuit substrate according to any one of claims 24 to 26, wherein the hole has a lens therein.

29. The optical circuit substrate according to any one of claims 24 to 26, wherein the substrate has a conductor circuit on a surface of an insulating substrate or an internal layer circuit substrate insulation-treated with a prepreg.

30. The optical circuit substrate according to any one of claims 24 to 26, wherein the substrate has a conductor circuit layer and an optical circuit layer separately.

31. The optical circuit substrate according to claim 30, wherein the substrate comprises a combination of a conductor circuit substrate and an optical circuit substrate.

32. The optical circuit substrate according to any one of claims 24 to 25, wherein the substrate material is a resin film and the means for fixing the optical fiber is the use of an adhesive-coated resin film, adhesive resin film or photosensitive resin.

33. The optical circuit substrate according to claim 32, wherein, in the plane shape of the optical circuit substrate, a cut or a projection is formed, the optical fiber is laid continuously from the main portion of the optical circuit to the portion surrounded by the said cut or to the projection, and the cut-section of the fiber is provided at the portion surrounded by the cut or at the projection.

34. A process for the preparation of an optical circuit substrate, which comprises making holes which pass through the substrate, forming a metal film on inner walls of the holes, placing and fixing an optical fiber in the form of a circuit on one side of the substrate, cutting an end portion of the optical fiber at the place of the hole provided previously so as to have an angle which permits refraction or reflection of light most in the direction of approximately 90 degrees relative to the substrate surface, placing and fixing an optical fiber in the form of a circuit on the other side of the substrate, and cutting an end of the optical fiber at the place of at least one of the holes provided above so as to have an angle which permits refraction or reflection of light most in the direction of approximately 90 degrees relative to the substrate surface.

35. A process for the preparation of an optical circuit, which comprises making holes which pass through a substrate, forming a metal film on inner walls of the holes, while placing and fixing an optical fiber in the form of a circuit on one side of the substrate, cutting an end portion of the optical fiber so as to be fixed just above the hole provided previously and to have an angle which permits refraction or reflection of light most in the direction of approximately 90 degrees relative to the substrate surface and then, while placing an optical fiber in the form of a circuit on the other side of the substrate, cutting an end portion of the optical fiber at the place of at least one of the holes provided previously so as to have an angle which permits refraction or reflection of light most in the direction of approximately 90 degrees relative to the substrate surface.

36. A process for the preparation of an optical circuit substrate, which comprises placing and fixing an optical fiber in the form of a circuit on one side of a substrate, cutting an end portion of the optical fiber at the place of a hole to be provided so as to have an angle which permits refraction or reflection of light most in the direction of approximately 90 degrees relative to the substrate surface, providing holes beneath the cut-section of the optical fiber from the back side of the substrate, forming a metal film on inner walls of the holes, placing and fixing optical fiber in the form of a circuit on the other side of the substrate, and cutting an end portion of the optical fiber at the place of at least one of the holes provided previously so as to have an angle which permits refraction or reflection of light most in the direction of approximately 90 degrees relative to the substrate surface.

37. A process for the preparation of an optical circuit substrate, which comprises placing and fixing an optical fiber in the form of a circuit on one side of a substrate, cutting an end portion of the optical fiber at the place of a hole to be provided so as to have an angle which permits refraction or reflection of light most in the direction of approximately 90 degrees relative to the substrate surface, providing holes beneath the cut-section of the optical fiber from the back side of the substrate, forming a metal film on inner walls of the holes, placing and fixing optical fiber in the form of a circuit on the other side of the substrate, and cutting an end portion of the optical fiber at the place of at least one of the holes provided previously so as to have an angle which permits refraction or reflection of light most in the direction of approximately 90 degrees relative to the substrate surface, wherein the hole is provided by boring a hole having a larger diameter than the final one, filling the hole with a resin capable of being bored with a laser beam, heat curing the resin, and using a laser beam for providing the hole.

38. A process for the preparation of an optical circuit substrate, which comprises cutting an end portion of an optical fiber, while placing the optical fiber in the form of a circuit on one side of a substrate so as to be fixed just above a hole to be provided later and to have an angle which permits refraction or reflection of light most in the direction of approximately 90 degrees relative to the substrate surface, providing the hole beneath the cut-section of the optical fiber from the back side of the substrate and then, while placing an optical fiber in the form of a circuit on the other side of the substrate, cutting an end portion of the optical fiber at the place of at least one of the holes so as to have an angle which permits refraction or reflection of light most in the direction of approximately 90 degrees relative to the substrate surface.

39. The process for the preparation of an optical circuit substrate according to claim 38, wherein the optical fiber is placed on a sticky film or an adhesive film provided on the substrate, while feeding the optical fiber and subjecting to pressure bonding or heat-pressure bonding at fixing positions varied by means of an NC apparatus.

40. The process for the preparation of an optical circuit substrate according to any one of claims 37 to 39, wherein the cut-section of the optical fiber is nearly specularly finished by treating it with an abrasive, hydrofluoric acid, borofluoric acid, or a solvent.

41. The process for the preparation of an optical circuit substrate according to any one of claims 37 to 39, wherein the hole is provided by boring a hole, and filling the hole with light transmittable resin.

42. The process for the preparation of an optical circuit substrate according to claim 41, wherein the form of the surface of the signal light transmittable resin is controlled by the extent of filling of the resin.

43. The process for the preparation of an optical circuit substrate according to claim 42, wherein, after filling the hole with the signal light transmittable resin, a lens is adhered to the opening of the hole not contacting with the optical fiber.

44. The process for the preparation of an optical circuit substrate according to claim 41, wherein after filling the hole with the signal light transmittable resin, a light receiving and transmitting element is provided on the opening of the hole not contacting with the optical fiber by registering a light input and output site thereof with the hole.

45. The process for the preparation of an optical circuit substrate according to any one of claims 37 to 39, wherein the hole is provided by using a laser.

46. The process for the preparation of an optical circuit substrate according to any one of claims 37 to 39, wherein the substrate is obtained from a photosensitive resin sheet, and the hole is provided by light exposure and subsequent development.

47. The process for the preparation of an optical circuit substrate according claim 41, wherein the hole is filled with two kinds of light-transmittable resins by filling first with a light-transmittable resin having a lower refractive index, boring a hole having a smaller diameter than the original hole, and filling the hole with a light-transmittable resin having a higher refractive index.

48. A process for the preparation of an optical circuit substrate, which comprises placing and fixing an optical fiber in the form of a circuit on a surface of a flexible base material, extending the optical fiber outside the flexible base material simultaneously, intersecting the extended optical fiber outside the flexible base material with an optical fiber fixed on another rigid substrate, and connecting both fibers by applying a light-transmittable adhesive to the intersecting point of both fibers.

49. A process for the preparation of an optical circuit substrate, which comprises laying a flexible base material on a rigid substrate fixing an optical fiber thereon, placing an optical fiber in the form of a circuit on the surface of the flexible base material while extending the optical fiber outside the flexible base material to the rigid substrate and fixing thereon, intersecting the extended optical fiber outside the flexible base material with the optical fiber fixed from the beginning, and connecting both fibers by applying a light-transmittable adhesive to the intersecting point of both fibers.

50. A process for the preparation of an optical circuit substrate, which comprises placing and fixing an optical fiber in the form of a circuit on a surface of a flexible base material, laying the optical fiber on the flexible base material on an optical fiber fixed on a rigid substrate so as to directly contact and intersect both optical fibers, and connecting both fibers by applying a light-transmittable adhesive to the intersecting point of both fibers.

51. A process for the preparation of an optical circuit substrate, which comprises placing and fixing an optical fiber in the form of a circuit on a surface of a flexible base material having holes in the portions to be connected, laying the flexible base material on a rigid substrate one upon another, intersecting an optical fiber fixed on the rigid substrate and the optical fiber provided on the flexible base material, and connecting both fibers by applying a light-transmittable adhesive to the intersecting point of both fibers.

52. A process for the preparation of an optical circuit substrate, which comprises placing and fixing an optical fiber in the form of a circuit on a surface of a flexible base material, extending optical fiber outside the flexible base material, intersecting the extended optical fiber outside the flexible base material with an optical fiber fixed on another flexible substrate, and connecting the two fibers by applying a light-transmittable adhesive to the intersecting point of the fibers.

53. A process for the preparation of an optical circuit substrate, which comprises laying a flexible base material on a flexible substrate fixing an optical fiber thereon, placing an optical fiber in the form of a circuit on the flexible base material, extending the optical fiber outside the flexible base material and fixing the fiber on the flexible substrate, intersecting the extended optical fiber outside the flexible base material with the optical fiber fixed from the beginning, and connecting the two fibers by applying a light-transmittable adhesive to the intersecting point of the fibers.

54. A process for the preparation of an optical circuit substrate, which comprises placing and fixing an optical fiber in the form of a circuit on a surface of a flexible base material, laying an optical fiber fixed on another flexible substrate and the optical fiber provided on the flexible base material one upon another so as to directly contact the two optical fibers each other and to intersect both optical fibers, and connecting the two optical fibers by applying a light-transmittable adhesive to the intersecting point of the fibers.

55. A process for the preparation of an optical circuit substrate, which comprises placing and fixing an optical fiber in the form of a circuit on a surface of a flexible base material having holes in the portions to be connected, laying the flexible base material and another flexible substrate one upon another, intersecting an optical fiber fixed on the flexible substrate and the optical fiber provided on the flexible base material, and connecting the two fibers by applying a light-transmittable adhesive to the intersecting point of the fibers.

56. The process for the preparation of an optical circuit substrate according to any one of claims 48 to 53, wherein the optical fibers are connected with each other by making the light-transmittable adhesive into the form of a sheet beforehand, interposing the sheet between the optical fibers to be connected, and applying pressure and heat thereto.

57. The process for the preparation of an optical circuit substrate according to any one of claims 48 to 53, wherein the light-transmittable adhesive is applied by drops with a dispenser.

58. The process for the preparation of an optical circuit substrate according to any one of claims 48 to 53, wherein the portion wherein the optical fibers are to be intersected is an end portion of each optical fiber.

59. A method for the connection of an optical circuit, which comprises intersecting two plastics-made optical fibers and applying pressure to the intersecting point of the fibers while applying energy by vibration to the point, wherein the pressure applied is reduced when the plastics-made optical fiber begins to deform.

60. The method for the connection of an optical circuit according to claim 59, wherein the portion at which the fibers are to be intersected is an end portion of each plastics-made optical fiber.

61. The method for the connection of an optical circuit according to claim 59 or 60, wherein the energy by vibration is energy by ultrasonic vibration.

62. The method for the connection of an optical circuit according to claim 59 or 60, wherein the energy by vibration is energy by laser beams.

63. A process for the preparation of an optical circuit substrate, which comprises placing and fixing an optical fiber in the form of a circuit on a surface of a flexible base material, extending the optical fiber outside the flexible base material, intersecting an optical fiber fixed on another rigid substrate with the extended optical fiber provided outside the flexible base material, and connecting the two fibers by applying pressure to the intersecting point of the fibers while applying energy by vibration to the point.

64. A process for the preparation of an optical circuit substrate, which comprises laying a flexible base material on a rigid substrate fixing an optical fiber thereon, placing an optical fiber in the form of a circuit on the surface of the flexible base material, extending the optical fiber outside the flexible base material while fixing the fiber on the rigid substrate, intersecting the optical fiber fixed from the beginning with the extended optical fiber provided outside the flexible base material, and connecting the two fibers by applying pressure to the intersecting point of the fibers while applying energy by vibration to the point.

65. A process for the preparation of an optical circuit substrate, which comprises placing and fixing an optical fiber in the form of a circuit on a surface of a flexible base material, laying an optical fiber fixing on another rigid substrate and the optical fiber provided on the flexible base material so as to directly contact the optical fibers and to intersect each other, and connecting the two fibers by applying pressure to the intersecting point of the fibers while applying energy by vibration to the point.

66. A process for the preparation of an optical circuit substrate, which comprises placing and fixing an optical fiber in the form of a circuit on a surface of a flexible base material having holes in the portions to be connected, laying the flexible base material and a rigid substrate one upon another, intersecting an optical fiber fixed on the rigid substrate and the optical fiber provided on the flexible base material, and connecting the two fibers by applying pressure to the intersecting point of the fibers while applying energy by vibration to the point.

67. A process for the preparation of an optical circuit substrate, which comprises placing and fixing an optical fiber in the form of a circuit on a surface of a flexible base material, extending the optical fiber outside the flexible base material, intersecting an optical fiber fixed on another flexible substrate and the optical fiber provided outside the flexible base material, and connecting the two fibers by applying pressure to the intersecting point of the fibers while applying energy by vibration to the point.

68. A process for the preparation of an optical circuit substrate, which comprises laying a flexible base material on a flexible substrate fixing an optical fiber thereon, placing an optical fiber in the form of a circuit on the surface of the flexible base material, while extending the optical fiber outside the flexible base material, fixing the extended fiber on the flexible substrate, intersecting the optical fiber fixed from the beginning with the extended optical fiber outside the flexible base material, and connecting the two fibers by applying pressure to the intersecting point of the fibers while applying energy by vibration to the point.

69. A process for the preparation of an optical circuit substrate, which comprises placing and fixing an optical fiber in the form of a circuit on a surface of a flexible base material, laying an optical fiber fixed on another flexible substrate and the optical fiber provided on the flexible base material one upon another so as to directly contact each other, intersecting the optical fibers each other, and connecting the two fibers by applying pressure to the intersecting point of the fibers while applying energy by vibration to the point.

70. A process for the preparation of an optical circuit substrate, which comprises placing and fixing an optical fiber in the form of a circuit on a surface of a flexible base material having holes in the portions to be connected, laying the flexible base material and another flexible substrate one upon another, intersecting an optical fiber fixed on the flexible substrate and the optical fiber provided on the flexible base material, and connecting the two fibers by applying pressure to the intersecting point of the fibers while applying energy by vibration to the point.

71. The process for the preparation of an optical circuit substrate according to any one of claims 63 to 70, wherein the pressure applied is reduced when the plastics-made optical fiber begins to deform.

72. The process for the preparation of an optical circuit substrate according to any one of claims 63 to 70, wherein the portion at which the fibers are to be intersected is an end portion of each plastics-made optical.

73. The process for the preparation of an optical circuit substrate according to any one of claims 63 to 70, wherein the energy by vibration is energy by ultrasonic vibration.

74. The process for the preparation of an optical circuit substrate according to any one of claims 63 to 70, wherein the energy by vibration is energy by laser beams.

75. The process according to claim 34, wherein at least the placing and fixing of the optical fiber on the one side of the substrate includes fixing the optical fiber so as to be in contact with the one side of the substrate.

76. The process according to claim 35, wherein at least the placing and fixing of the optical fiber on the one side of the substrate includes fixing the optical fiber so as to be in contact with the one side of the substrate.

77. The process according to claim 36, wherein at least the placing and fixing of the optical fiber on the one side of the substrate includes fixing the optical fiber so as to be in contact with the one side of the substrate.

* * * * *